(12) United States Patent
Trugman (10) Patent No.: US 9,166,991 B2
(45) Date of Patent: Oct. 20, 2015

(54) IDENTIFYING BUSINESS TRANSACTIONS FROM TRAFFIC IN AN ENTERPRISE CONTENT MANAGEMENT SYSTEM

(75) Inventor: Rodney M. Trugman, Alpharetta, GA (US)

(73) Assignee: RTIP, Inc., Alpharetta, GA (US)

( * ) Notice: Subject to any disclaimer, the term of this patent is extended or adjusted under 35 U.S.C. 154(b) by 178 days.

(21) Appl. No.: 13/456,649

(22) Filed: Apr. 26, 2012

(65) Prior Publication Data

US 2013/0290476 A1 Oct. 31, 2013

(51) Int. Cl.
*G06F 15/16* (2006.01)
*H04L 29/06* (2006.01)

(52) U.S. Cl.
CPC .................. *H04L 63/1408* (2013.01)

(58) Field of Classification Search
CPC ....................................... H04L 67/02
USPC ........................................ 709/217
See application file for complete search history.

(56) References Cited

U.S. PATENT DOCUMENTS

| 7,653,742 | B1* | 1/2010 | Bhargava et al. | 709/240 |
| 2006/0107255 | A1* | 5/2006 | Chagoly et al. | 717/127 |
| 2007/0067794 | A1* | 3/2007 | Russell et al. | 725/25 |
| 2007/0245137 | A1* | 10/2007 | Bhagat et al. | 713/153 |
| 2007/0271517 | A1* | 11/2007 | Finkelman et al. | 715/742 |
| 2009/0125532 | A1* | 5/2009 | Wexler et al. | 707/100 |
| 2010/0161616 | A1* | 6/2010 | Mitchell | 707/741 |
| 2010/0223471 | A1* | 9/2010 | Fresko et al. | 713/176 |
| 2011/0126088 | A1* | 5/2011 | Stuart | 715/206 |

* cited by examiner

*Primary Examiner* — Hamza Algibhah
(74) *Attorney, Agent, or Firm* — Cantor Colburn LLP (57) ABSTRACT

Systems and methods are disclosed for identifying business transactions from traffic in an enterprise content management system. The system intercepts HTTP messages that originate from or are destined for a server in an enterprise content management (ECM) system. The system also receives notifications related to lifecycle events in the ECM system. The system then correlates information in the HTTP messages and the notifications to identify a corresponding business transaction performed by the ECM system.

20 Claims, 7 Drawing Sheets

IDENTIFYING BUSINESS TRANSACTIONS FROM TRAFFIC IN AN ENTERPRISE CONTENT MANAGEMENT SYSTEM

CROSS REFERENCE TO RELATED APPLICATIONS

Not applicable.

TECHNICAL FIELD

The present disclosure generally relates to enterprise content management systems, and more specifically to identifying business transactions from traffic in an enterprise content management system

BACKGROUND

Today, enterprises such as businesses, governments, educational institutions, and various other organizations use vast amounts of data to drive decision making in their organization. Enterprises use many varieties of computerized information systems and a large amount of networking infrastructure to manage and organize the structured, semi-structured, and unstructured data used by the enterprise. As the number of systems and the amount of data continues to grow, keeping these systems running at an acceptable level of availability and performance becomes more of a challenge.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications, and equivalents included within the spirit and scope of the disclosure as defined by the appended claims.

DETAILED DESCRIPTION

Figure 1:
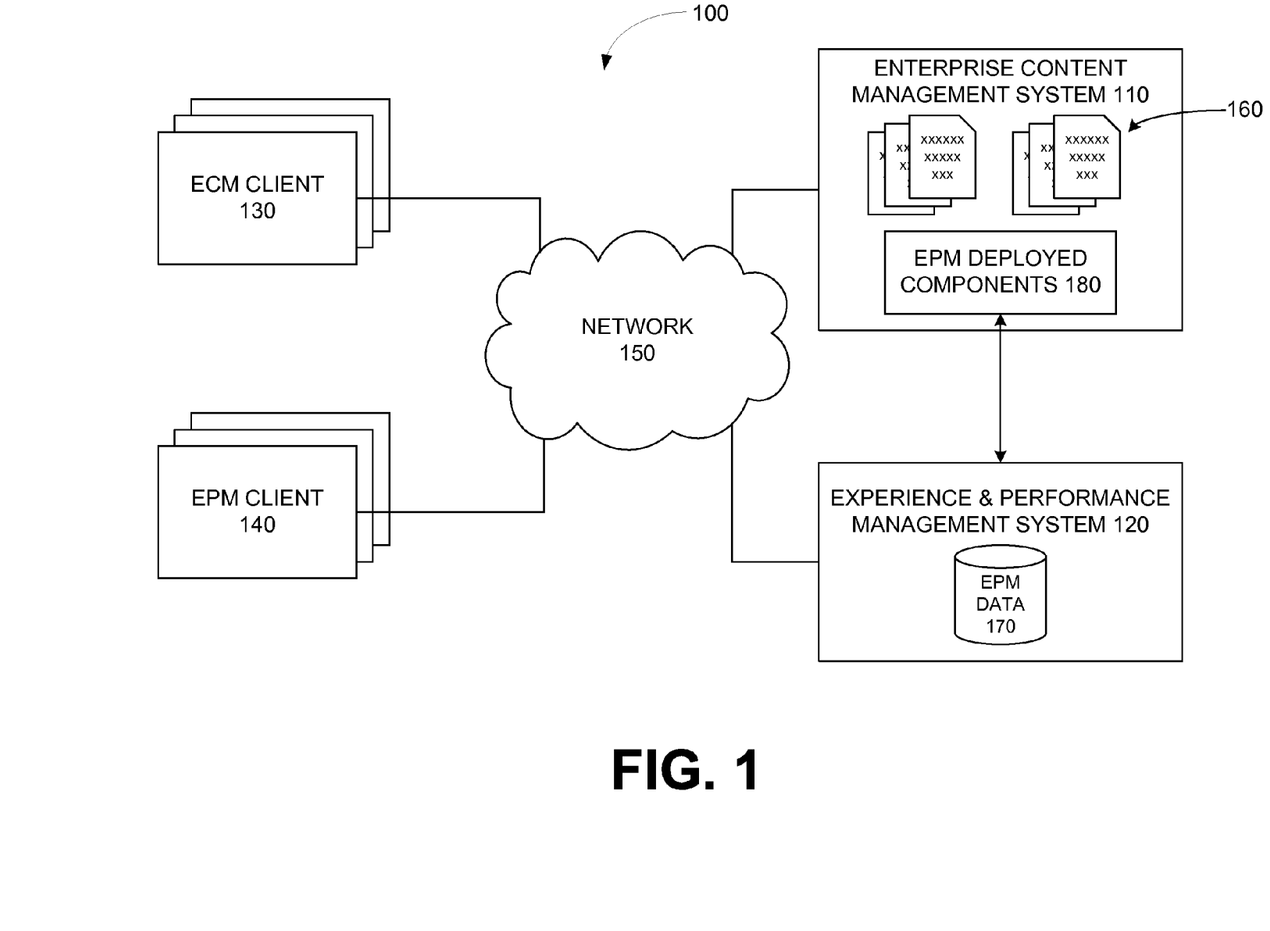
FIG. 1 is a high-level block diagram of a networked environment including an application performance monitoring (APM) system, according to some embodiments disclosed herein.

FIG. 1 is a high-level block diagram of a networked environment. The environment 100 includes an enterprise content management (ECM) system 110, an application performance monitoring (APM) system 120, one or more ECM clients 130, and one or more APM clients 140. These components communicate with each other via a network 150 such as the Internet. In implementations in which the network 150 corresponds to the Internet, the components of FIG. 1 may be connected to the Internet using various technologies, such as local area networks (LANs), wide area networks (WANs), wired networks, wireless networks, and combinations thereof. However, such details are not shown. In other implementations, the network 150 corresponds to an intranet or extranet rather than to the Internet.

Enterprise content management (ECM) system 110 provides various computing services associated with content 160 and/or documents that are related to the organizational processes of an enterprise, such as capturing, managing, storing, preserving, and/or delivering the content and documents to various users. Users associated with the enterprise interact with ECM system 110 through various ECM clients 130. For example, a user may, through ECM client 130, view or check out documents, collaborate and share documents with other users. As another example, a user may interact with ECM client 130 to run a workflow application which leads a user through various forms necessary to complete a business task. ECM system 110 may include components that are specific to or customized for a particular enterprise. In some embodiments, ECM system 110 is implemented with Microsoft SharePoint®, but the techniques disclosed herein also apply to other enterprise content management systems.

Application Performance Monitoring (APM) system 120 provides computing services that monitor the behavior and health of software and hardware components of ECM system 110. In particular, as users associated with an enterprise interact with business-related content through ECM system 110, APM system 120 collects experience and performance data 170 that allows the enterprise to monitor the actual user experience with ECM system 110 in terms of, for example, response times, activity levels during particular time periods, etc. As shown in FIG. 1, APM system 120 may include some software components 180 that are deployed within ECM system 110, while the remaining components may be separate from ECM system 110.

The experience and performance data collected by APM system 120 may be provided through various mechanisms, and in various forms, to enterprise personnel such as managers, decision-makers, or system administrators. These users interact with the APM system 120 through one or more APM clients 140. For example, APM system 120 may generate and provide to users a dashboard display of various metrics related to the monitored ECM system 110. APM system 120 may allow users to generate reports related to the monitored metrics, and to configure alerts and alarms which are triggered when the metrics go out of range. As another example, APM system 120 may allow a user to create tests that exercise specific functionality of ECM system 110.

Figure 2:
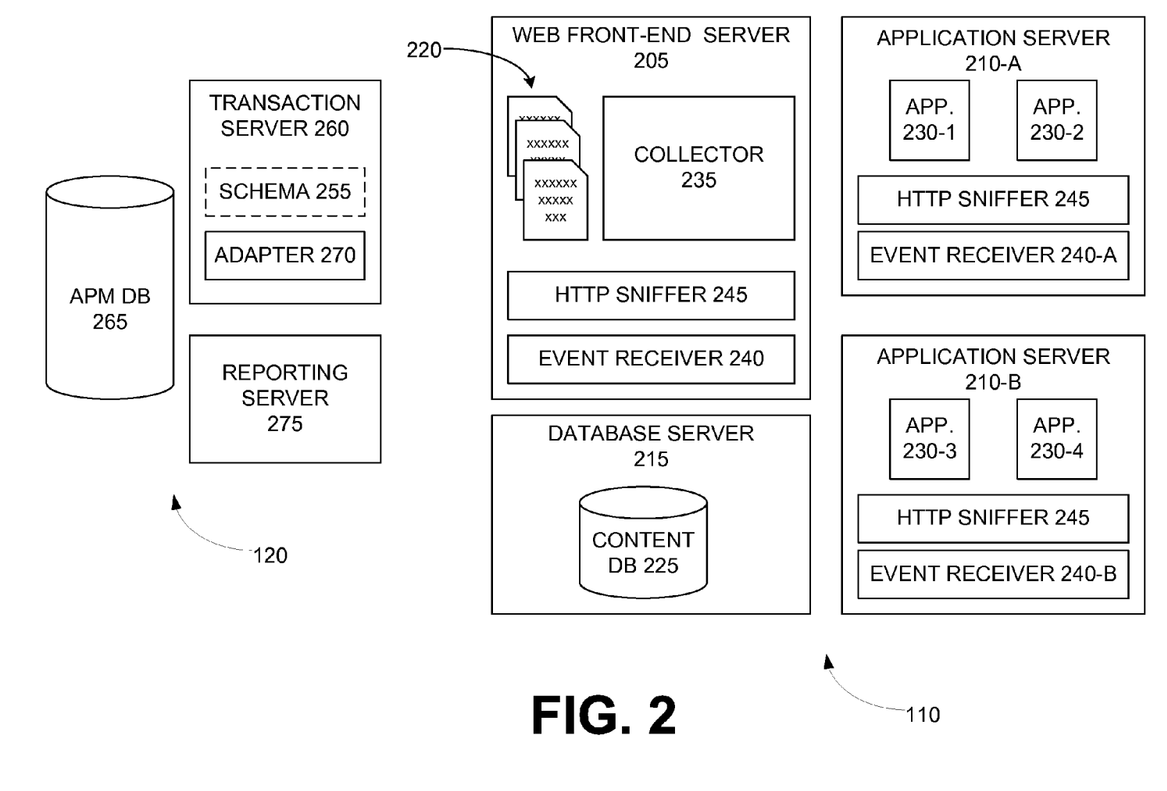
FIG. 2 is a block diagram of the APM system of FIG. 1, according to some embodiments disclosed herein.

FIG. 2 is another block diagram illustrating selected components of the environment 100 from FIG. 1. While FIG. 1 depicted the environment as a whole at a high level, FIG. 2 instead illustrates some of the components of ECM system 110 and APM system 120 in more detail.

In the example configuration shown in FIG. 2, ECM system 110 includes one or more web front-end servers 205, one or more application servers 210, and one or more database servers 215. Such a collection of servers may be referred to as a "server farm." A web front-end server 205 operates as a Hyper Text Transport Protocol (HTTP) server, serving up enterprise content 220 to various ECM clients 130 (shown in FIG. 1). Content 220 may take the form of, for example, sites, lists, or libraries. Although content 220 may be cached locally by a web front-end server 205, a content database 225 on database server 215 acts as a repository for the content 220. An application server 210 hosts various services or granular components of functionality which combine to provide the overall functionality of the ECM system 110. In the example configuration shown in FIG. 2, applications 230-1 and 230-2 are hosted by application server 210-A while applications 230-3 and 230-4 are hosted by application server 210-B.

A non-limiting list of services which may be hosted by an application server 210 includes search indexing, application discovery, and load balancing. Some service applications may be part of the ECM platform itself (e.g., part of Microsoft SharePoint®), while others may be provided by a third party to extend the functionality of ECM system 110. The services hosted by application server 210 may be implemented using a variety of middleware frameworks, such as Sharepoint® Service Application Framework, Windows Communication Foundation (WCF), service-oriented architecture (SOAP), representational state transfer (REST), remote procedure calls (RPC), and combinations thereof.

As mentioned above in connection with FIG. 1, APM system 120 includes components 180 that are deployed within ECM system 110. As shown in FIG. 2, these deployed APM components 180 include a collector 235, one or more event receivers 240, and one or more HTTP sniffers 245. In the embodiment shown in FIG. 2, an instance of HTTP sniffer 245 and an instance of event receiver 240 are deployed on all web front-end servers 205 and application servers 210, while a single collector 235 is deployed on one of web front-end servers 205 or application servers 210.

Collector 235 receives messages from HTTP sniffer(s) 245, and event receiver(s) 240. These messages are generated as users interact with ECM system 110 to perform various business-level transactions, for example, completing a specific workflow (e.g., Order Widget) or checking out a particular file (e.g., Check Out Prospectus). When associated with time and quantity information, these enterprise transactions measure the actual experience of users interacting with ECM system 110. A non-limiting list of experience metrics includes average time to check out a particular document and number of orders completed using a particular workflow during a one-hour period.

Collector 235 examines the incoming sniffer messages and event receiver messages and create one or more transaction packets which encapsulate at least a portion of the data from the sniffer-provided HTTP messages and the ECM-provided events. Data encapsulated by collector 235 in a transaction packet may include, for example, a transaction packet type, an IP address and/or port from the sender (client) or receiver (server), a user name, a session identifier, an instance identifier, a timestamp, a uniform resource indicator (URI), a content size, an object type, an ECM site name, an ECM list title, an ECM object type, and an ECM item name. Collector 235 may map user name to client IP address and vice versa. After creating a transaction packet, collector 235 communicates the transaction packet to the APM system 120. In particular, collector 235 sends the packets to a transaction server 260.

The process of extracting business-level transactions from the stream of transaction packets provided by the collector 235 will be described at a high level here, then explained in further detail below. In brief, transaction server 260 processes the transaction packets according to a transaction schema 255 which contains definitions of the supported transactions. For example, the schema may indicate that a Check Out transaction includes the following sequence: an event indicating creation of a check out object; an HTTP GET message with a first specified URI; an HTTP PUT message with a second specified URI; and an event indicating deletion of a check out object. The schema may be implemented, for example, using eXtensible Markup Language (XML).

A non-limiting list of business-level transaction types includes: document; folder; list; search; and workflow. A non-limiting list of business-level transactions includes:
   Add Document
   CheckOut Document
   CheckIn Document
   Cancel CheckOut
   View Document
   Delete Document
   Add List
   Delete List
   Add Folder
   Delete Folder
   Search
   Workflow Started
   Workflow Completed
   Workflow Postponed Once the transaction server 260 has identified a particular business transaction by correlating the series of transaction messages received from collector 235, transaction server 260 writes the transactions to an APM database 265. In some embodiments, an adapter module 270 may translate the transaction data from one format to another. For example, the transaction packets generated by collector 235 and received by transaction server 260 may be expressed in XML while APM database 265 uses a binary record format. In such cases, adapter module 270 may create a database record appropriate for APM database 265, and then populate the record from the XML data in the received transaction packet.

Once business-level transactions are stored in APM database 265, other components of APM system 120 may utilize the transaction data in various ways. For example, a reporting sever 275 may communicate this data to enterprise users such as managers and decision-makers by generating various reports. Reporting sever 275 may also check various metrics associated with the transactions and determine whether a transaction metric has exceeded or has dropped below a service level threshold (e.g., 25% of View Document transactions have exceeded a threshold). Reporting sever 275 may also proactively take remedial action when a service level violation is detected.

Having discussed the overall process of identifying business-level transactions in the ECM system 110 from a combination of HTTP traffic and ECM object events, HTTP sniffer 245 and event receiver 240 will now be discussed in more detail. An event receiver 240 receives notifications related to the lifecycle of various objects in ECM system 110. A non-limiting list of lifecycle events includes add, delete, move, update, check in, check out, cancel check out, and convert. A non-limiting list of ECM objects includes sites, lists, list items, documents, folders, searches, and workflows. A given event receiver 240 may handle notifications for more than one type of ECM object.

As noted above, each event receiver 240 is deployed on a particular server 205 or 210. An event receiver 240 registers to receive notifications for those objects that are managed by applications hosted on that server 205 or 210. For example, event receiver 240-A is hosted on server 210-A and therefore handles notifications for objects managed by applications 230-1 and 230-2.

An HTTP sniffer 245 intercepts or sniffs HTTP traffic originating at, or destined for, its corresponding server 205 or 210. As a web server, web front-end server 205 receives requests for web pages and provides a web page in response. Thus, an HTTP sniffer 245 deployed on a web front-end server 205 will generally see corresponding HTTP messages such as GET, PUT, POST, etc. In addition, middleware protocols such as SOA protocol (SOAP) and REST build on HTTP, so an HTTP sniffer 245 deployed on a web front-end server 205 may also see HTTP messages that correspond to SOAP and REST traffic. Similarly, an HTTP sniffer 245 deployed on an application server 210 will see HTTP messages for SOAP and REST traffic associated with applications 230 hosted on that application server 210.

Figure 3:
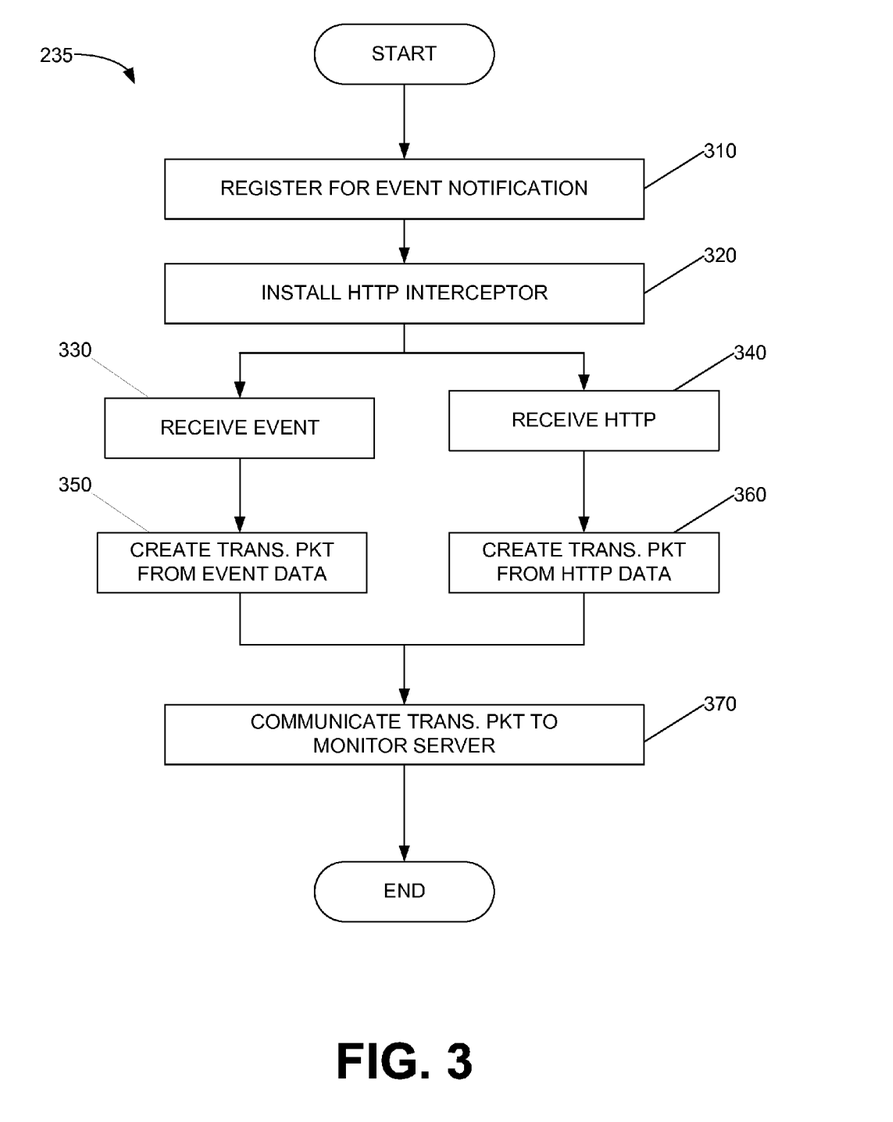
FIG. 3 is a flowchart describing operation of a portion of the APM system of FIG. 1, according to some embodiments disclosed herein.

FIG. 3 is a flowchart describing operation of a portion of deployed APM components 180. The process begins at block 310, where event receivers 240 (FIG. 2) register with ECM system 110 (FIGS. 1 and 2) to receive notifications for ECM object lifecycle events. In configurations involving multiple event receivers 240, each event receiver 240 may register separately. Next, at block 320, the HTTP sniffers 245 (FIG. 2) are installed and each begins intercepting HTTP traffic on the server 205 or 210 on which the sniffer is installed.

As event notifications and HTTP messages are received by event receiver 240 and HTTP sniffer 245 respectively, these events and messages are communicated to collector 235 at block 330 and block 340, respectively. In some embodiments, communication between event receiver 240/HTTP sniffer 245 and collector 235 is implemented with a queuing service, such as Microsoft Messaging Queuing Service. Event receiver 240/HTTP sniffer 245 may preprocess the event/message before communicating the data to collector 235. By doing so, only a subset of information in the event/message is passed on to collector 235. The preprocessing may also add information that is not in the actual object lifecycle event or HTTP message, for example, information identifying event receiver 240 or HTTP sniffer 245.

Processing then continues at block 350 or block 360, depending on whether an event or HTTP message was received. In either case, collector 235 creates a transaction packet using data from the event or message. Finally, at block 370, collector 235 sends the transaction packet to the transaction server 260, and the process of FIG. 3 is complete.

Figure 4:
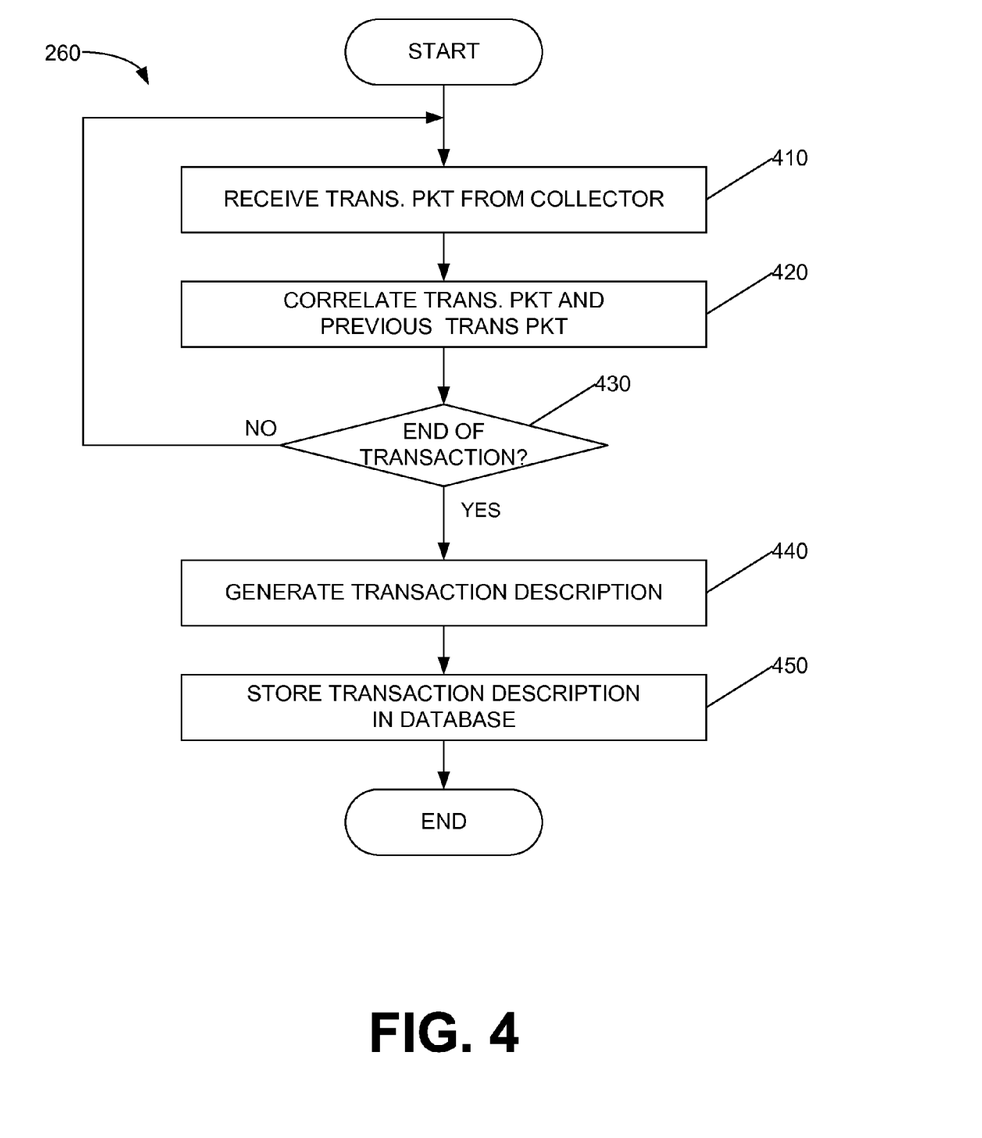
FIG. 4 is a flowchart describing operation of another portion of the APM system of FIG. 1, according to some embodiments disclosed herein.

FIG. 4 is a flowchart describing operation of a portion of transaction server 260. The process begins at block 410, where transaction server 260 receives a transaction packet from collector 235. At block 420, transaction server 260 attempts to correlate the received transaction packet with one or more previously received transaction packets. For example, transaction packets having similar timestamps may be considered to be part of the same business transaction. As another example, transaction packets having the same application identifier may be treated as belonging to the same business transaction. In some embodiments, multiple correlations are required before a sequence of events and HTTP messages are treated as belonging to the same business transaction. The correlation process will be described in more detail in FIGS. 5 and 6.

Next, at block 430, transaction server 260 determines whether the transaction packet received at block 410 marks the end of a business-level transaction. If No, then processing continues at block 410, where transaction server 260 awaits another transaction packet. If Yes, then at block 440, transaction server 260 generates a description of the transaction, including specifics from the transaction packet (e.g., file or folder name, timestamps, user name). In some embodiments, the description may be expressed in XML. Next, at block 450, transaction server 260 stores the transaction in APM database 265. Some embodiments of APM system 120 may translate the description from one format to another, for example from XML to a binary record format as used by a relational database. Though not expressly shown in the flowchart, the process of FIG. 3 eventually terminates, either through a graceful exit or an abnormal condition such an exception, but otherwise continues to process events and messages indefinitely.

Figure 5:
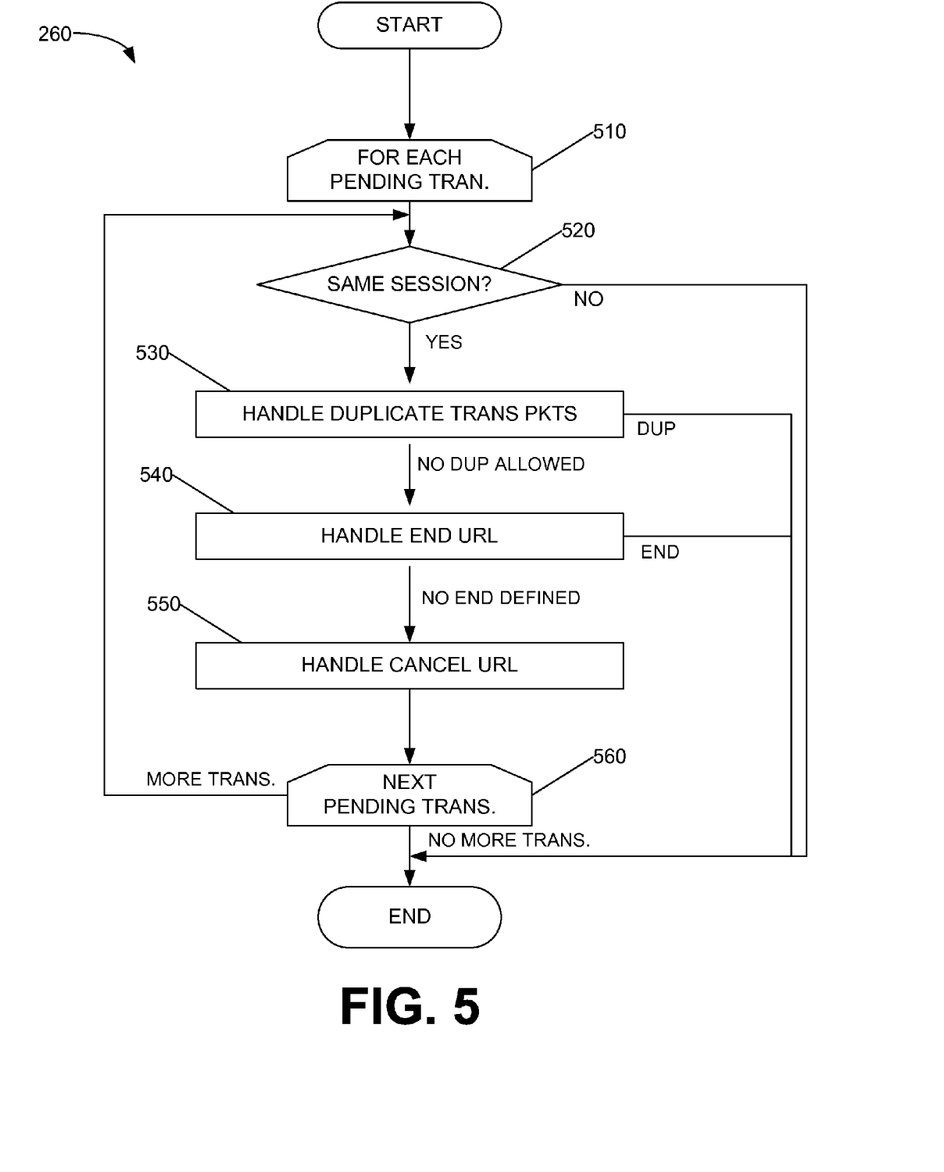
FIG. 5 is a flowchart describing operation of yet another portion of the APM system of FIG. 1, according to some embodiments disclosed herein.
Figure 6:
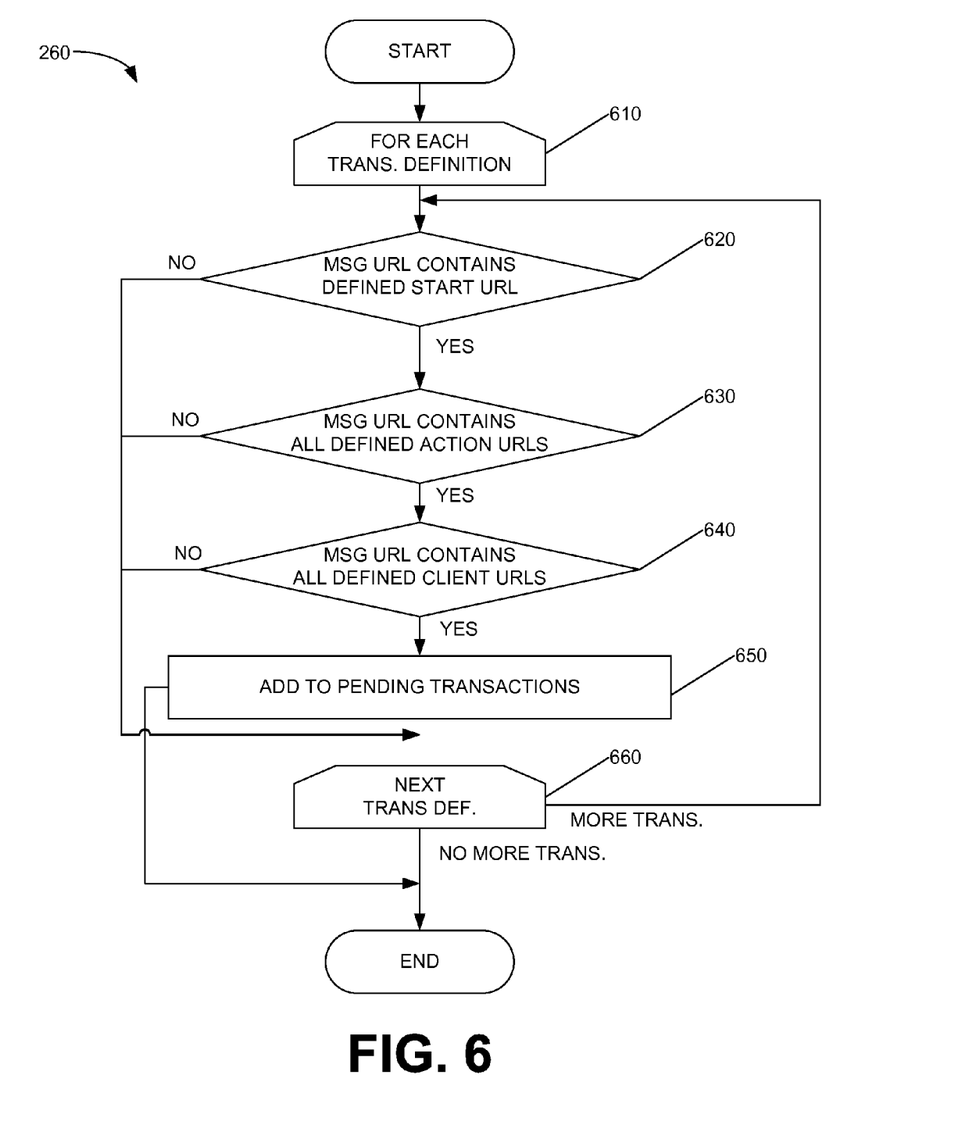
FIG. 6 is a block diagram of a computing device which can be used to implement the APM system of FIG. 1, according to some embodiments disclosed herein.

As mentioned above, blocks 420 and 430 in FIG. 4 process the current transaction packet in the context of a series of previously received transaction packets in order to identify a single business level transaction defined in schema 255. This process will now be described in more detail in connection with FIGS. 5 and 6. Before describing those details, an example of a transaction definition will now provided in order to provide context for the discussion of FIGS. 5 and 6. In some embodiments, a transaction definition includes the following fields:

| | |
|---|---|
| name | The name of the transaction |
| index | The unique index of the transaction starting at 1. |
| timeout | how long to wait for the end of the transaction. |
| startsession | boolean indicating beginning of a session. All transactions ignored until start transaction found. |
| endsession | Set to true to clear all session/lookup variables for the sessionId. |
| command | Special actions for non-real transaction (id=0) such as Copy Session. |
| <start_URL>* | The first URL of the transaction. |
| <end_URL>* | The last URL of the transaction. |
| <cancel_URL>* | Cancel current transaction if this URL found. |
| <ignore_URL>* | When in middle of transaction ignore this URL for new transaction. |
| <URL_action>* | The action to check for only in the URL (client content). |
| <action>* | The action to check for in the post data and all client content (client content). |
| <not_action>* | This action should not be in the post data (client content). |
| <end_action>* | The action to check for in the post data with the end_URL(client content). |
| <cancel_action>* | The action to check for in the post data with the cancel_URL(client content). |
| <newtrans_URL name="Transaction Name" index="19">URL</newtrans_URL> | Change current transaction to a new transaction |
| <sessionid> | The variable for the session id. |
| <userid> | The variable for the user id. |

FIG. 5 is a flowchart describing operation of a portion of transaction server 260. More specifically, FIG. 5 describes in more detail the operation of a portion of blocks 420 and 430 in FIG. 4, which processes a current transaction packet in the context of a series of previously received transaction packets in order to identify a single business level transaction defined in schema 255. On entry to block 510, a transaction packet has already been received (block 410 in FIG. 4). At block 510, transaction server 260 begins a loop which iterates through an existing list of pending (already received) transaction packets. At block 520, transaction server 260 determines whether the current transaction packet in the pending list represents the same session as the received transaction packet (from block 410). In some embodiments, this determination is made by examining a session identifier stored in the transaction packets. If the received transaction packet does not represent the same session, processing continues at block 560, which iterates to the next pending transaction. If the received transaction packet does represent the same session, transaction server 260 updates one or more transaction byte counts.

Next, at block 520, transaction server 260 checks for the existence of duplicate packets in the transaction, and handles a duplicate if found. To do so, transaction server 260 examines the definition of the current pending transaction to determine if duplicate packets are allowed and the definition does not include an end URL. If either condition is false, then processing continues at block 540 (discussed below). If both conditions are true, transaction server 260 then compares the StartURL in the definition with the URL of the currently received transaction packet. If the URLs match, then the currently received transaction packet is a duplicate, which is saved for later completion, and the process is complete. If the URLs do not match, then the currently received packet is not a duplicate, and the current pending transaction is completed and processing continues at block 560, with the iteration of the next pending transaction.

Next, at block 530, transaction server 260 checks for the end of the current transaction and handles the end if found. To do so, transaction server retrieves the EndURL in the definition of the current pending transaction and compares this with the URL of the currently received transaction packet. If no match is found, processing continues at block 560, with the iteration of the next pending transaction. If the URLs do match, the currently received transaction packet marks the end of a business-level transaction and transaction server 260 handles this by checking the definition for any required Ending Post Data actions. If no Ending actions are required, then transaction server 260 completes the pending transaction and the process is complete. However, if the definition of the current pending transaction does require one or more Ending actions, the URL of the currently received transaction packet is compared to the list of Ending actions in the definition. If all required Ending actions are found in the URL, then transaction server 260 completes the pending transaction and the process is complete. If all required Ending actions are not found in the URL, processing continues at block 540.

Transaction server 260 reaches block 540 if the current pending transaction is not an end of the transaction or a duplicate transaction. At block 540, checks for a cancelled transaction and handles the cancelled transaction if found. To do so, transaction server 260 retrieves the CancelURL in the definition of the current pending transaction and compares this with the URL of the currently received transaction packet. If no match is found, processing continues at block 560, with the iteration of the next pending transaction. If the URLs do match, transaction server 260 checks the definition for any required Cancel Post Data actions. If no Cancel Post Data actions are required, then the process is complete. However, if the definition of the current pending transaction does require one or more Cancel Post Data actions, the URL of the currently received transaction packet is compared to the list of Cancel Post Data actions in the definition. If all required Cancel actions are found in the URL, then transaction server 260 removes the pending transaction from the list and the process is complete. If all required Ending actions are not found in the URL, processing continues at block 560, with the iteration of the next pending transaction.

When it is determined at block 560 that all transactions on the pending transaction list have been processed, then the process of FIG. 5 is complete.

FIG. 6 is a flowchart describing operation of a portion of transaction server 260. More specifically, FIG. 6 describes in more detail the operation of a portion of blocks 420 and 430 in FIG. 4, which processes a current transaction packet in the context of a series of previously received transaction packets in order to identify a single business level transaction defined in schema 266. On entry to block 610, a transaction packet has already been received (block 410 in FIG. 4) and has been processed against the list of currently pending transactions. Thus, on entry to block 610, transaction server 260 has determined that the currently received transaction packet is not part of a pending transaction.

Transaction server 260 thus handles the packet as a new transaction by attempting to match the transaction packet with a transaction definition in schema 266. Therefore, at block 610, transaction server 260 begins iterating through all the defined transactions. A series of tests is applied at blocks 620, 630, and 640, and if the transaction packet passes all the tests, then at block 660 the currently received transaction packet is added to the list of currently pending transactions and the process of FIG. 6 is complete The tests include: comparing the URL of the transaction packet to the StartURL in the definition (block 620); comparing the URL of the transaction packet to all of the ActionURLs in the definition (block 630); and comparing the URL of the transaction packet to all the ClientURLs in the definition (block 640). If any of the tests fail, then processing continues at block 660, which iterates to the next transaction definition. When all definitions have been handled, the process of FIG. 6 is complete.

Figure 7:
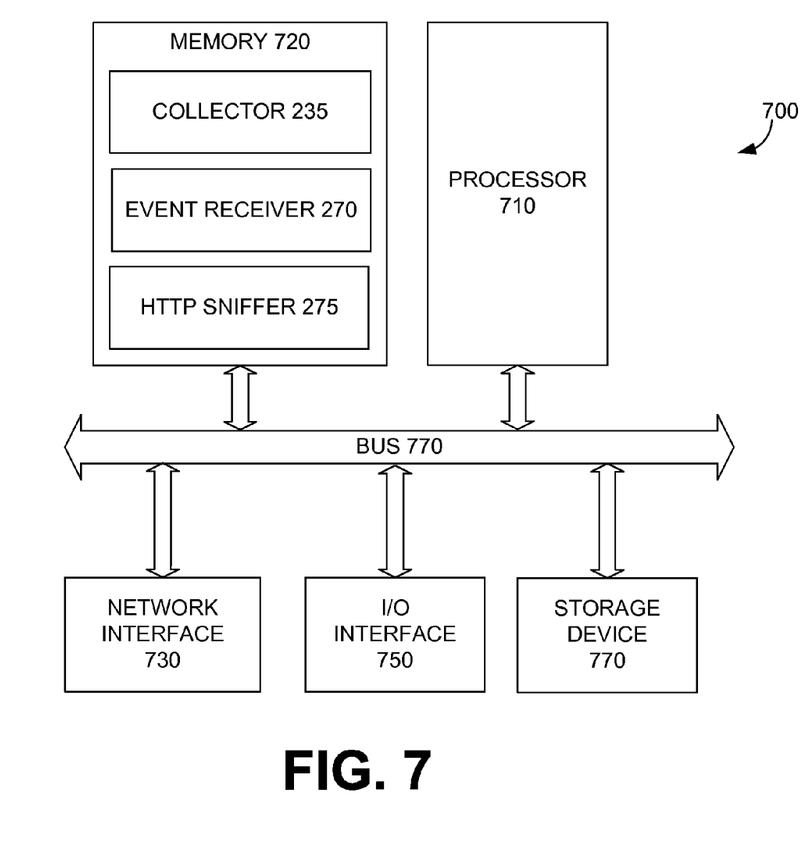
FIG. 7 is a block diagram of a computing device on which the various components of ECM system 110 and APM system 120 can execute.

FIG. 7 is a block diagram of a computing device 400 on which the various components of ECM system 110 and APM system 120 can execute. Computing device 700 includes a processor 710, memory 720, a network interface 730, a storage device 740 (e.g., non-volatile memory or a disk drive), and one or more input output (I/O) interfaces 750. These hardware components are coupled via a bus 760. Omitted from FIG. 7 are a number of components that are unnecessary to explain the operation of ECM system 110 and APM system 120.

The various components of APM system 120 can be implemented in software (i.e., instructions executing on a processor). FIG. 7 depicts a software implementation, with memory 720 used to store collector 235, event receiver 240, and HTTP sniffer 245. Any or all of these components can also be implemented in specialized hardware logic. Hardware implementations include (but are not limited to) a programmable logic device (PLD), programmable gate array (PGA), field programmable gate array (FPGA), an application-specific integrated circuit (ASIC), a system on chip (SoC), and a system in package (SiP). These components may be implemented using any combination of hardware and software, as should be appreciated.

In some embodiments of APM system 120, one or more of the software-implemented components are stored on a computer-readable medium, which in the context of this disclosure refers to any structure which can contain, store, or embody instructions executable by a processor. The computer readable medium can be, for example, based on electronic, magnetic, optical, electromagnetic, infrared, or semiconductor technology. Specific examples of a computer-readable medium using electronic technology include (but are not limited to) the following: a random access memory (RAM); a read-only memory (ROM); and an erasable programmable read-only memory (EPROM or Flash memory). A specific example using magnetic technology includes (but is not limited to) a disk drive; and a portable computer diskette. Specific examples using optical technology include (but are not limited to) a compact disk read-only memory (CD-ROM) or a digital video disk read-only memory (DVD-ROM).

Any process descriptions or blocks in flowcharts would be understood as representing modules, segments, or portions of code which include one or more executable instructions for implementing specific functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The above description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

At least the following is claimed:

1. A method comprising:
    intercepting HTTP messages, originating from or destined for, a server in an enterprise content management (ECM) system;
    receiving ECM lifecycle events describing lifecycles of objects managed by applications executing in the ECM system;
    generating a series of transaction packets that encapsulate at least a portion of the intercepted HTTP messages and at least a portion of the received ECM lifecycle events;
    processing a current one in the series of transaction packets in the context of previous ones in the series of transaction packets, wherein the processing comprises correlating the HTTP messages and the ECM lifecycle events within the series of transaction packets; and
    identifying, based on the correlation, a corresponding ECM business-level transaction, associated with a category of document, folder, list, search, or workflow, that is performed by the ECM system.

2. The method of claim 1, wherein the ECM system is implemented using Microsoft Sharepoint®.

3. The method of claim 1, further comprising:
    determining whether the correlated HTTP messages and ECM lifecycle events match a transaction defined in a transaction schema; and
    if a matching transaction is found, identifying the corresponding ECM business-level transaction based on the matching transaction in the transaction schema.

4. The method of claim 1, wherein the correlating is based on whether an identifier in one of the intercepted HTTP messages matches a same identifier in one of the received ECM lifecycle events.

5. The method of claim 1, wherein the correlating is based on whether an identifier field in one of the intercepted HTTP messages matches a different identifier field in one of the received ECM lifecycle events.

6. The method of claim 1, further comprising:
    registering with the ECM system for notification of the ECM lifecycle events.

7. The method of claim 1, wherein the communicating further comprises:
    generating a message including information describing the identified ECM business-level transaction; and
    sending the message to the APM system.

8. The method of claim 1, wherein the information describing the identified ECM business-level transaction identifies a user that performed the identified business transaction or represents a duration of the business transaction.

9. The method of claim 7, wherein the information describing the ECM business-level transaction identifies enterprise content of the ECM business-level transaction or identifies a server in the ECM that executed the ECM business-level transaction or identifies an application in the ECM that executed the ECM business-level transaction.

10. The method of claim 1, wherein the processing further comprises:
    processing a current transaction in a pending transaction list by comparing a URL field in the current transaction with an End URL field in one of a plurality of transaction definitions in a transaction schema; and
    designating the one of the ECM business-level transaction definitions as the identified ECM business-level transaction when the comparison finds a match on the URL fields.

11. The method of claim 1, wherein the processing further comprises:
    upon determining that the current one in the series of transaction packets is not part of a pending transaction, looking for a match with one of a plurality of ECM business-level transaction definitions in a transaction schema.

12. The method of claim 1, wherein the ECM business-level transaction corresponds to a task that is specific to an organization.

13. The method of claim 1, wherein the ECM business-level transaction corresponds to a sequence of actions performed by users to complete a task is specific to an organization.

14. A system comprising:
    a memory having instructions stored thereon;
    a processor configured by the instructions to:
        intercept HTTP messages originating from, or destined for, a server in an enterprise content management (ECM) system;
        receive ECM lifecycle events describing lifecycles of document, folder, list, search, or workflow objects in the ECM system;
        generate a series of transaction packets that encapsulate at least a portion of the intercepted HTTP messages and at least a portion of the received ECM lifecycle events; and
        correlate the HTTP messages and the ECM lifecycle events within the series of transaction packets to identify a corresponding ECM business-level transaction performed by the ECM system.

15. The system of claim 14, wherein the processor is further configured by the instructions to:

while iterating through a pending transaction list, compare a current one of the series of transaction packets with an End URL field in a ECM business-level transaction definition, the ECM business-level transaction definition being associated with a current pending transaction in the pending transaction list; and;

designate the compared ECM business-level transaction as the identified ECM business-level transaction when the comparison finds a match between an End URL field of the ECM business-level transaction definition and a URL field in the current one of the series of transaction packets.

16. A method comprising:

intercepting HTTP messages, originating from or destined for, a server in an enterprise content management (ECM) system;

receiving ECM lifecycle events describing lifecycles of objects in the ECM system;

examining information in the HTTP messages and the ECM lifecycle events to find a correlation between the HTTP messages and the ECM lifecycle events; and identifying a single ECM business-level transaction that is performed by the ECM system based on the correlation.

17. The method of claim 16, wherein the ECM lifecycle events further describe lifecycles of objects managed by applications executing in the ECM system.

18. The method of claim 16, wherein the ECM business-level transaction is associated with a category of document, folder, list, search, or workflow.

19. The method of claim 16, wherein the ECM lifecycle events further describe lifecycles of document, folder, list, search, or workflow objects in the ECM system.

20. The method of claim 11, wherein the looking further comprises:

comparing a URL in the current one of the series of transaction packets to multiple URL fields in the one of the ECM business-level transaction definitions;

adding the current one of the series of transaction packets to a pending transaction list when the comparison succeeds.

* * * * *